United States Patent
Sun et al.

(10) Patent No.: US 6,879,464 B2
(45) Date of Patent: Apr. 12, 2005

(54) AIR BEARING HAVING A CAVITY PATCH SURFACE COPLANAR WITH A LEADING EDGE PAD SURFACE

(75) Inventors: Biao Sun, Fremont, CA (US); Pablo G. Levi, Milpitas, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 66 days.

(21) Appl. No.: 10/222,042

(22) Filed: Aug. 16, 2002

(65) Prior Publication Data

US 2004/0032694 A1 Feb. 19, 2004

(51) Int. Cl.[7] .................. G11B 5/60; G11B 15/64; G11B 17/32; G11B 21/20
(52) U.S. Cl. .................. 360/236.3; 360/236.2
(58) Field of Search .................. 360/236.2, 236.3, 360/235.5, 235.4, 237, 235.6, 235.7, 235.9, 234.3, 234, 230; 29/603.12, 603.16; 216/22, 41, 67

(56) References Cited

U.S. PATENT DOCUMENTS

| 6,477,013 | B1 | * | 11/2002 | Kang et al. | 360/236.3 |
| 6,529,346 | B2 | * | 3/2003 | Otsuka | 360/235.8 |
| 2002/0008939 | A1 | * | 1/2002 | Boutaghou et al. | 360/235.8 |
| 2002/0030938 | A1 | * | 3/2002 | Boutaghou et al. | 360/236.3 |
| 2003/0227717 | A1 | * | 12/2003 | Cha et al. | 360/236.2 |

* cited by examiner

*Primary Examiner*—Julie Anne Watko
(74) *Attorney, Agent, or Firm*—Joshua C. Harrison, Esq.; Carr & Ferrell LLP

(57) ABSTRACT

An air bearing surface for read/write head of a magnetic disk drive is disclosed. The air bearing surface includes a trailing edge pad and a leading edge pad with trailing portions. A cavity is defined between the trailing edge pad and the trailing portions of the leading edge pad. A cavity patch is disposed within the cavity. The cavity patch can be disposed within the cavity towards one side of the read/write head.

8 Claims, 4 Drawing Sheets

US 6,879,464 B2

AIR BEARING HAVING A CAVITY PATCH SURFACE COPLANAR WITH A LEADING EDGE PAD SURFACE

BACKGROUND OF THE INVENTION

1. Field of the Invention

The present invention relates generally to the field of magnetic disk drives, and more particularly to a design for an air bearing surface of a read/write head for a magnetic disk drive.

2. Description of the Prior Art

Magnetic disk drives are used to store and retrieve data for digital electronic apparatuses such as computers. In FIGS. 1 and 2, a magnetic disk data storage system 10 includes an enclosure 12, a disk drive motor 14, and a magnetic disk, or media, 16 supported for rotation by a drive spindle 17 of motor 14. Also included are an actuator 18 and an arm 20 attached to an actuator spindle 21 of actuator 18. A suspension 22 is coupled at one end to the arm 20 and at another end to a read/write head 24. The suspension 22 and the read/write head 24 are commonly collectively referred to as a head gimbal assembly (HGA). The read/write head 24 typically includes an inductive write element and a magnetoresistive read element that are held in a very close proximity to the magnetic disk 16. As the motor 14 rotates the magnetic disk 16, as indicated by the arrow R, an air bearing is formed under the read/write head 24 causing the read/write head to lift slightly off of the surface of the magnetic disk 16, or, as it is commonly termed in the art, to "fly" above the magnetic disk 16. Data bits can be written or read along a magnetic "track" of the magnetic disk 16 as the magnetic disk 16 rotates past the read/write head 24. The actuator 18 moves the read/write head 24 from one magnetic track to another by pivoting the arm 20 and the suspension 22 in an arc indicated by arrows P. The design of magnetic disk data storage system 10 is well known to those skilled in the art.

The magnetic disk data storage industry has been very successful at deriving ever greater data densities on magnetic disks 16 by pursuing the miniaturization of various components such as the read/write head 24. In particular, the miniaturization of the read/write head 24, in combination with advances in their designs and the surfaces of magnetic disks 16, has enabled ever increasing data densities by allowing the read/write head 24 to fly ever closer to the surface of the magnetic disk 16. Lower fly heights are advantageous because the decreased spacing between the read/write head 24 and the magnetic disk 16 allows for smaller data bits to be written to the magnetic disk 16 and for smaller data bits to be sensed by the read element of the read/write head 24. Unfortunately, lower fly heights also increase the likelihood that the flying read/write head 24 will collide catastrophically ("crash") with the magnetic disk 16. Thus, establishing a fly height for a particular magnetic disk data system 10 encompasses a trade-off between higher data density and the probability of a crash.

As is well known in the art, once an optimum fly height for a particular magnetic disk data system 10 is chosen, an air bearing surface (ABS) for the read/write head 24 must be designed. The ABS should be designed to allow the read/write head 24 to maintain the desired fly height over a range of operating conditions including the changes in air flow speed and direction as the read/write head 24 is moved between tracks on the magnetic disk 16. An additional operating condition that should be taken into account when designing an ABS is the changes in ambient air pressure that the magnetic disk data system 10 will experience when operated at varying elevations. The desire to be able to manufacture one read/write head 24 that will be compatible with different magnetic disk data systems 10 has lead to another ABS design goal, namely the ability to maintain the desired fly height over a range of different magnetic disk 16 rotation rates. A further consideration in ABS design is simplicity in fabrication which can be realized by limiting the number of processing steps. Accordingly, what is desired is an ABS design that can provide a read/write head with a fly height that has greater insensitivity to changes in both magnetic disk rotation rate and ambient air pressure, and that may be fabricated without additional processing steps.

SUMMARY

The invention is directed to an improved air bearing surface design for a read/write head in a magnetic disk drive. The air bearing surface design includes a feature, termed a "patch," that allows the read/write head to maintain a fly height with greater insensitivity to changes in the rotation rate of the magnetic disk and the ambient air pressure. While a read/write head employing an air bearing surface of the invention would be appropriate to a magnetic disk drive with a variable-speed magnetic disk, typically magnetic disk drives include magnetic disks that operate at fixed rotation rates. A read/write head employing an air bearing surface of the invention can, however, be used in different magnetic disk drives with different fixed rotation rates. The ability to use the same read/write head in different magnetic disk drives allows the one read/write head to be manufactured more inexpensively due to the economies of scale.

An air bearing surface of a read/write head of the invention includes a trailing edge pad disposed near a trailing edge of the read/write head, and a leading edge pad disposed near a leading edge of the read/write head. The leading edge pad has trailing portions that extend back towards the trailing edge along inside diameter (ID) and outside diameter (OD) sides of the read/write head. The air bearing surface also includes a cavity disposed between the trailing portions and the trailing edge pad and that defines a surface. The air bearing surface further includes a cavity patch disposed within the cavity. The cavity patch can be located off-center within the cavity such that it is disposed between the ID side and a longitudinal axis of the air bearing surface. The air bearing surface optionally can include side pads adjacent each of the trailing portions of the leading edge pad and that in some embodiments are integral therewith.

Both the leading edge pad and the trailing edge pad can include two surfaces, an air bearing portion and a shallow step portion, each defining a surface above the cavity surface. In those embodiments that include side pads, the side pads also can include air bearing portions and shallow step portions. The surfaces defined by the air bearing portions of the pads are typically substantially coplanar, as are the shallow step portions. While this arrangement is advantageous to minimize the number of processing steps required to define the entire air bearing surface, in some embodiments the air bearing portions and shallow step portions of the various pads define surfaces each at a different level. In still other embodiments, despite possibly requiring further processing steps, some or all of the various pads include more than two surfaces.

In the air bearing surface of the invention the cavity patch also defines a surface spaced above the surface defined by the cavity. This cavity patch surface is advantageously substantially coplanar with either the surface defined by the air bearing portions or the shallow step portions so that producing the cavity patch does not require additional processing steps. Nevertheless, in some embodiments the cavity patch surface is neither substantially coplanar with the air bearing portion surface nor the shallow step portion surface but at some other level between the surfaces of the cavity and of the air bearing portions. In still other embodiments the cavity patch defines more than one surface spaced above the surface defined by the cavity.

A double-etch method for fabricating a read/write head with an RPM insensitive air bearing surface is also disclosed herein. The method includes two masking and etching steps. In the first masking step portions of a side of the read/write head are masked to preserve these portions to become the air bearing portions of the pads of the air bearing surface described above. In the first etching step the side is etched to a first depth beneath a depth of the air bearing portions. In the second masking step the air bearing portions are again masked to continue to preserve them. In the second masking step certain portions of the surface at the first depth are masked to preserve these portions through the next etching step. The portions of the surface at the first depth that are also masked include a leading edge shallow step portion, a trailing edge shallow step portion, and a cavity patch disposed between the shallow step portions. The portions masked at the first depth will become the cavity patch and the shallow step portions of the pads of the air bearing surface described above. In the second etching step the side is etched to a second depth beneath the first depth to produce a cavity of the air bearing surface described above.

DETAILED DESCRIPTION OF THE INVENTION

Figure 1:
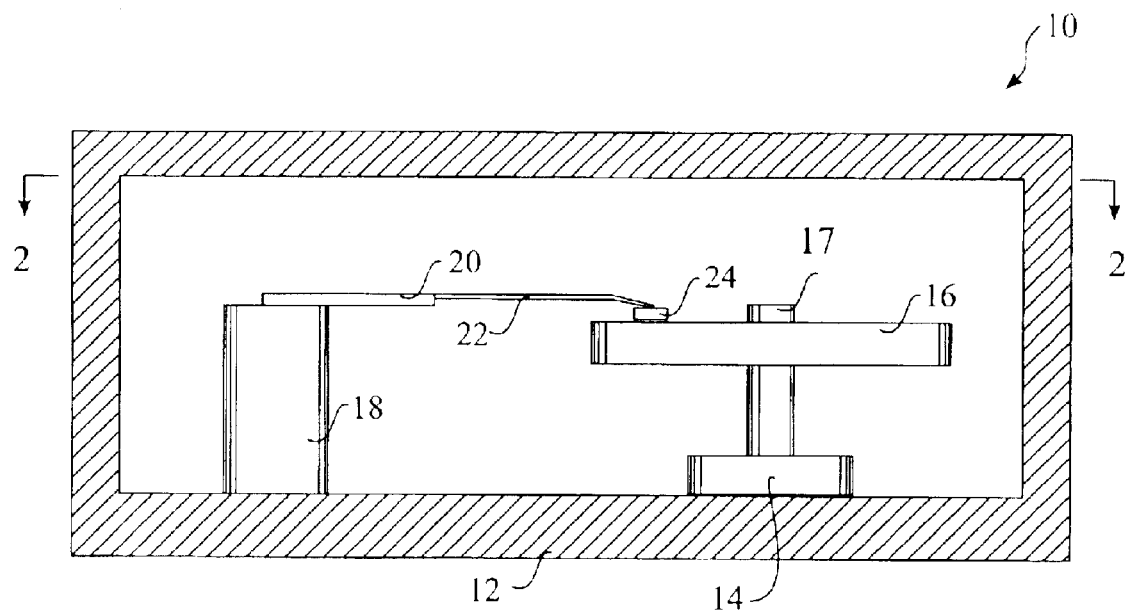
FIG. 1 is a partial cross-sectional view of a magnetic data storage system according to the prior art.
Figure 2:
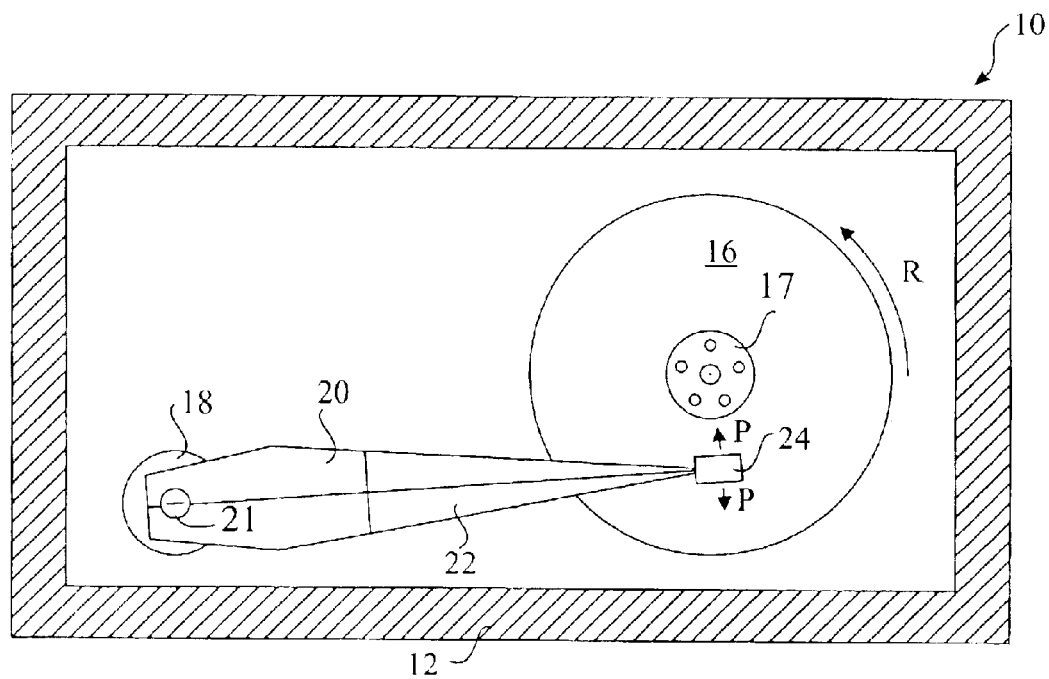
FIG. 2 is a partial cross-sectional view taken along line 2—2 of FIG. 1.
Figure 3:
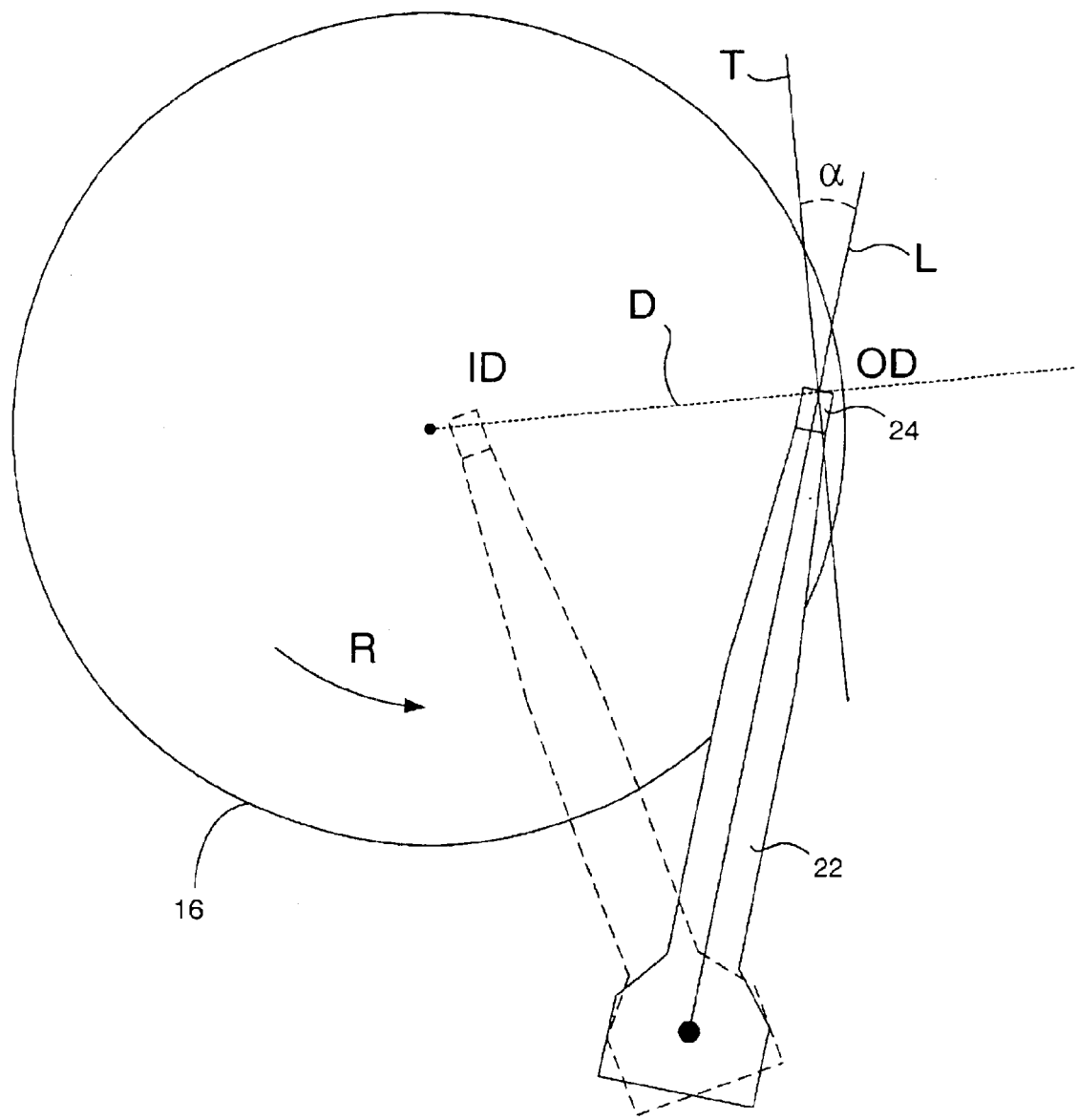
FIG. 3 illustrates the range of motion of a read/write head relative to a magnetic disk.

Referring back to FIGS. 1 and 2, FIG. 3 is a plan view of a read/write head 24 disposed over a magnetic disk 16 to further illustrate the range of motion of the suspension 22 and the read/write head 24 relative to the magnetic disk 16 from the inside diameter (ID) to the outside diameter (OD). An arrow R indicates the direction of spin of the magnetic disk 16 and, accordingly, the direction of the air flow past the read/write head 24. It can be seen that, from the frame of reference of the read/write head 24, as the read/write head 24 is translated from ID to OD the direction of the air flow beneath it changes. Further, as the read/write head 24 is translated from ID to OD the velocity of the air flow increases. Accordingly, the read/write head 24 needs to be designed to maintain a desired fly height under conditions of changing air flow velocity and direction.

The orientation of the read/write head 24 around a vertical axis is a parameter called skew. Specifically, a skew angle $\alpha$ is the angle formed between a longitudinal axis L of the read/write head 24 and a tangent T. The tangent T is tangential to a diameter D drawn from a center of the magnetic disk 16 through the point on the read/write head where the read and/or write elements are located. It can be seen from FIG. 3 that the skew angle $\alpha$ changes sign as the read/write head 24 is translated between the ID and the OD. By convention, the skew angle $\alpha$ is defined as a negative value at the ID, a positive value at the OD, and zero when the longitudinal axis L is parallel to the tangent T.

The side of the read/write head 24 that faces into the airflow is commonly referred to as a leading edge and the opposite side as a trailing edge. As the skew angle $\alpha$ goes from negative to positive, the direction of the airflow relative to the read/write head 24 changes. At negative skew angles the ID corner of the leading edge faces into the airflow, while at positive skew angles the OD corner of the leading edge faces into the airflow. Other flight characteristics include pitch and roll. Pitch is a measure of the height of the leading edge relative to the trailing edge, and roll is a measure of the height of an ID edge relative to the height of an OD edge. It will be appreciated that pitch and roll also need to be controlled to maintain the desired fly height.

Yet another factor that can influence fly height is atmospheric pressure. Unless the enclosure 12 is pressurized, the air pressure within the enclosure 12 will vary with the ambient air pressure. At sea level the ambient pressure is 1 atmosphere (atm), however, at 10,000 feet above sea level ambient air pressure falls to approximately 0.7 atm, and at 18,000 feet above sea level ambient air pressure falls to approximately 0.5 atm. As the air pressure within the enclosure 12 falls there is less of an air bearing and consequently the fly height decreases, thereby increasing the likelihood of a crash. Generally, the degree of fly height reduction as a function of decreasing air pressure varies as a function of skew angle. Specifically, since the air flow velocity at the ID is lower than at the OD, decreasing the air pressure causes a greater lowering of the fly height at the ID than at the OD.

Figures 4, 5:
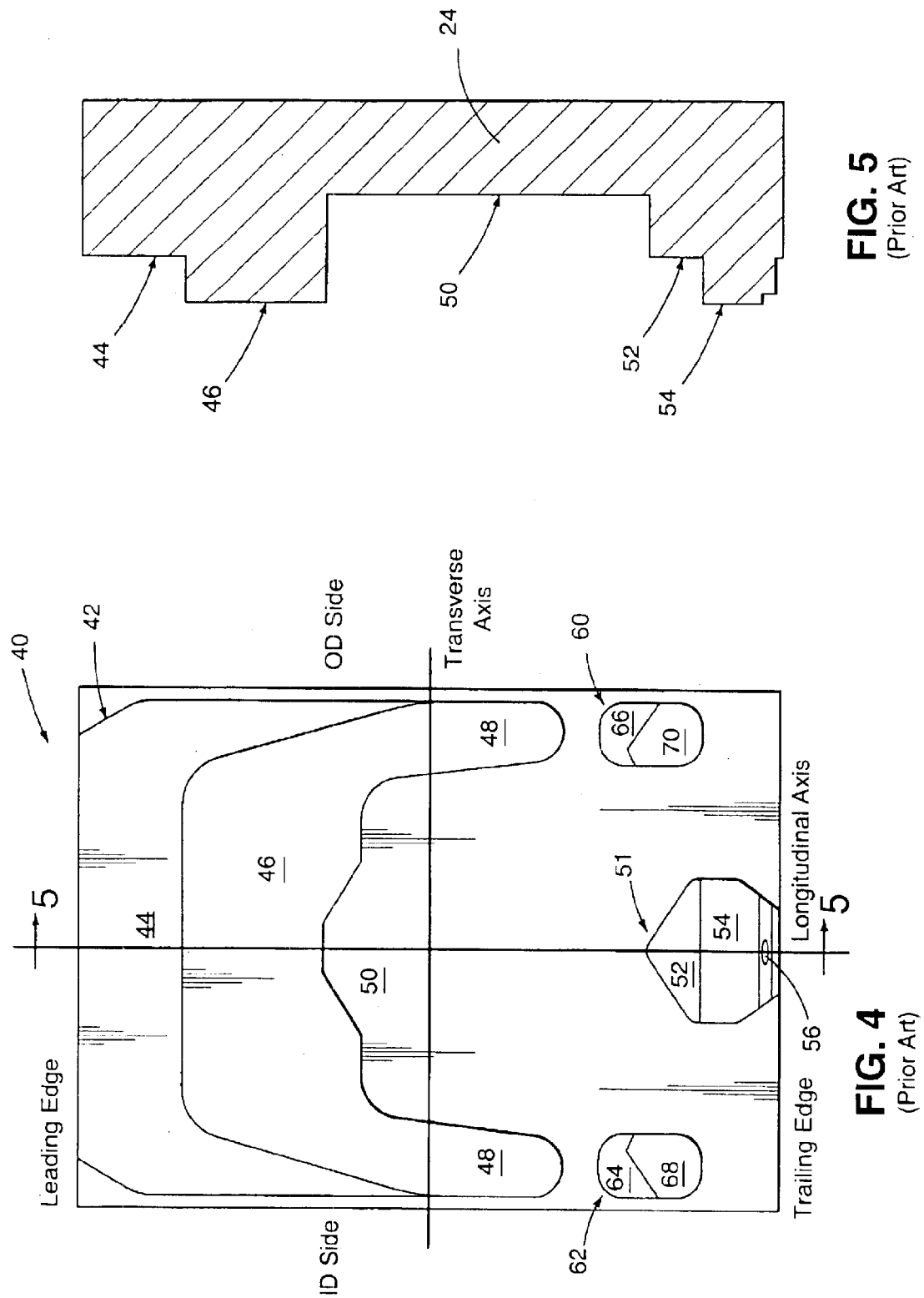
FIG. 4 shows a plan view of an air bearing surface of a read/write head.
FIG. 5 is a cross-sectional view of the air bearing surface of FIG. 4 along the line 5—5.

Again referring back to FIGS. 1 and 2, FIG. 4 is a plan view of an air bearing surface (ABS) 40 of a read/write head 24 and FIG. 5 is a cross-section through read/write head 24 along the line 5—5. The ABS 40 is the side of the read/write head that faces the magnetic disk 16. Air bearing surfaces such as ABS 40 are carefully engineered structures designed to control the various flight characteristics of the read/write head 24 (e.g., fly height, roll angle, etc.) as the read/write head 24 is translated between ID and OD and as the magnetic disk 16 is started and stopped. A typical ABS 40 includes a set of pads configured to create regions of positive lift and to define spaces therebetween to provide regions of negative lift. Here, positive lift is defined as a force that pushes the read/write head 24 away from the magnetic disk 16, and negative lift is defined as a force that draws the read/write head 24 towards the magnetic disk 16.

More specifically, ABS 40 includes a leading edge pad 42 that includes a shallow step portion 44 and an air bearing portion 46. The leading edge pad 42 is shaped to provide sufficient lift through the range of air flow directions and air flow velocities that the read/write head 24 encounters in service. In particular, the air bearing portion 46 is the highest portion of the leading edge pad 42 and is therefore the closest surface to the magnetic disk 16. Since the spacing between the air bearing portion 46 and the magnetic disk 16 is very close, a positive air pressure develops above the air bearing portion 46. Here, a positive air pressure is defined as an air pressure greater than the ambient air pressure. The positive air pressure creates positive lift on the read/write head 24 which pushes the read/write head 24 away from the magnetic disk 16.

The shallow step portion 44 helps channel the air flow, as it is encountered at the leading edge of the read/write head 24, into the space between the air bearing portion 46 and the magnetic disk 16. As above, a positive air pressure is also developed over the shallow step portion 44 that provides further positive lift to the read/write head 24. However, since the shallow step portion 44 is beneath the air bearing portion 46, and therefore further from the magnetic disk 16, the magnitude of the air pressure increase over the shallow step portion 44 is lower than that over the air bearing portion 46.

The air bearing portion 46 of the leading edge pad 42 tapers back towards the trailing edge of the ABS 40 on both an ID side and an OD side. The trailing portions 48 of the air bearing portion 46 define therebetween a cavity 50 that is lower than the shallow step portion 44. When the read/write head 24 is in flight over the magnetic disk 16, a negative air pressure develops within the cavity 50 and exerts a negative lift on the read/write head 24 drawing it closer to the magnetic disk 16. The magnitude of the force drawing the read/write head 24 towards the magnetic disk 16 depends, in part, on the depth of the cavity 50 and its surface area. By varying the parameters of the cavity 50 to increase the amount of negative lift, one can adjust the fly height of the read/write head 24 to be lower. The negative lift produced by the cavity 50 not only serves to cause the read/write head 24 to fly closer to the magnetic disk 16, but also helps stabilize the fly height against perturbations.

The read/write head 24 includes read and write elements that are exposed to the magnetic disk 16 at the ABS 40. Since the highest reading and writing performances are achieved by minimizing the spacing between the read and write elements and the magnetic disk 16, the flight characteristics of the read/write head 24 are tailored so that the read and write elements are at the closest point to the magnetic disk 16. Accordingly, the read and write elements are positioned near the trailing edge of the read/write head 24 and the trailing edge is provided with a lower amount of positive lift than the leading edge so that the read/write head 24 maintains a positive pitch angle in flight. Here, a positive pitch angle is defined as a flight characteristic in which the leading edge is further from the magnetic disk 16 than the trailing edge.

ABS 40 is therefore provided with a trailing edge pad 51 to provide lift to the trailing edge. The trailing edge pad 51 is provided with a smaller surface area than that of the leading edge pad 42 so that the trailing edge pad 51 will provide less lift than the leading edge pad 42 to cause the trailing edge to fly lower (i.e., closer) to the magnetic disk 16. The trailing edge pad 51 is provided with a trailing shallow step portion 52 and a trailing air bearing portion 54 that are analogous in function to the shallow step portion 44 and the air bearing portion 46 of the leading edge pad 42. For simplicity of construction, as will be described more fully below, the shallow step portions 44 and 52 are sub substantially coplanar, as are the air bearing portions 46 and 54.

The trailing edge pad 51 is positioned proximate to the trailing edge, as shown, to position the transducer 56 near the point on the ABS 40 that is closest to the magnetic disk 16 during flight. The trailing edge pad 51 is therefore approximately centered on a longitudinal axis of the ABS 40. The position and shape of the trailing edge pad 51 further defines the cavity 50 and creates ID and OD channels through which air can flow out of the cavity 50.

Side pads 60 and 62 serve to control roll of the read/write head 24 around a transverse axis of the ABS 40 by providing additional lift towards the trailing edge of the ABS on both the ID and OD sides. The shape and position of the side pads 60 and 62 further define the cavity 50 and further narrow the ID and OD channels. The side pads 60 and 62 include side shallow step portions 64 and 66, and side air bearing portions 68 and 70 that are analogous in function and substantially coplanar with the shallow step portion 44 and the air bearing portion 46 of the leading edge pad 42. In some embodiments the side pads 60 and 62 are integral with the trailing portions 48 of the leading edge pad 42.

Both the rotation rate of the magnetic disk 16 and the ambient air pressure will cause the read/write head 24 to fly differently. As the magnetic disk 16 is rotated faster to improve data transfer rates, the airflow velocity increases over the entire range from ID to OD as a function of the radius of the magnetic disk 16. Consequently, as the rotation rate increases the fly height of the read/write head increases over the OD more than it increases over the ID. Accordingly, it has been the practice to design and manufacture read/write heads for use with specific magnetic disks that will be used at specific rotation rates.

Similarly, increasing the ambient air pressure will tend to increase the fly height and decreasing the ambient air pressure will tend to decrease the fly height, again with the difference being most pronounced towards the OD of the magnetic disk 16. Increased ambient air pressure isn't typically an issue for magnetic disk data storage systems 10 as there aren't too many places one can take a magnetic disk data storage system 10 where the ambient air pressure is much above that at sea level. However, at higher elevations and in pressurized aircraft the ambient pressure can be several tens of percent lower than at sea level which will cause a read/write head 24 to fly closer to the magnetic disk 16, increasing the likelihood of a crash. Consequently, one design goal for the configuration of an ABS 40 is to minimize the change in the fly height of the read/write head 24 as a function of decreasing air pressure.

As noted above, one emerging goal in the magnetic disk data storage system industry is to be able to manufacture the same read/write head 24 for use in different magnetic disk data storage systems 10 employing magnetic disks 16 spinning at different rotation rates. This has introduced a further design criteria, that of minimizing the change in fly height as a function of magnetic disk rotation rate. A read/write head 24 that can be used with a variety of magnetic disk 16 rotation rates is commonly referred to as having an RPM insensitive ABS 40. Towards the end of an RPM insensitive ABS 40, one solution has been to deepen the cavity 50 by providing higher pads 42, 51, 60, and 62. Increasing the depth of the cavity 50 further lowers the air pressure within the cavity 50 during flight at a given air flow speed. As a function of increasing air flow, a deeper cavity 50 creates proportionately more negative lift than the pads 42, 51, 60 and 62 provide positive lift to keep the fly height within acceptable limits when the read/write head 24 is at the OD and at the highest rotation rate. However, it has been found that increasing the height of the pads 42, 51, 60 and 62 tends to worsen the decrease in fly height as a function of decreasing ambient air pressure.

Another design approach that has been found to both minimize changes in fly height as functions of both magnetic disk 16 rotation rate and ambient air pressure is to define further sub-cavaties within the cavity 50. Such sub-cavities, created by an additional etch step, for example, create small regions within the cavity 50 where the air pressure is even lower than in the surrounding cavity 50. Although the use of sub-cavities within the cavity 50 has been successful, the sub-cavities cost more to manufacture because they require additional masking and etching steps ("triple-etch").

Figure 6:
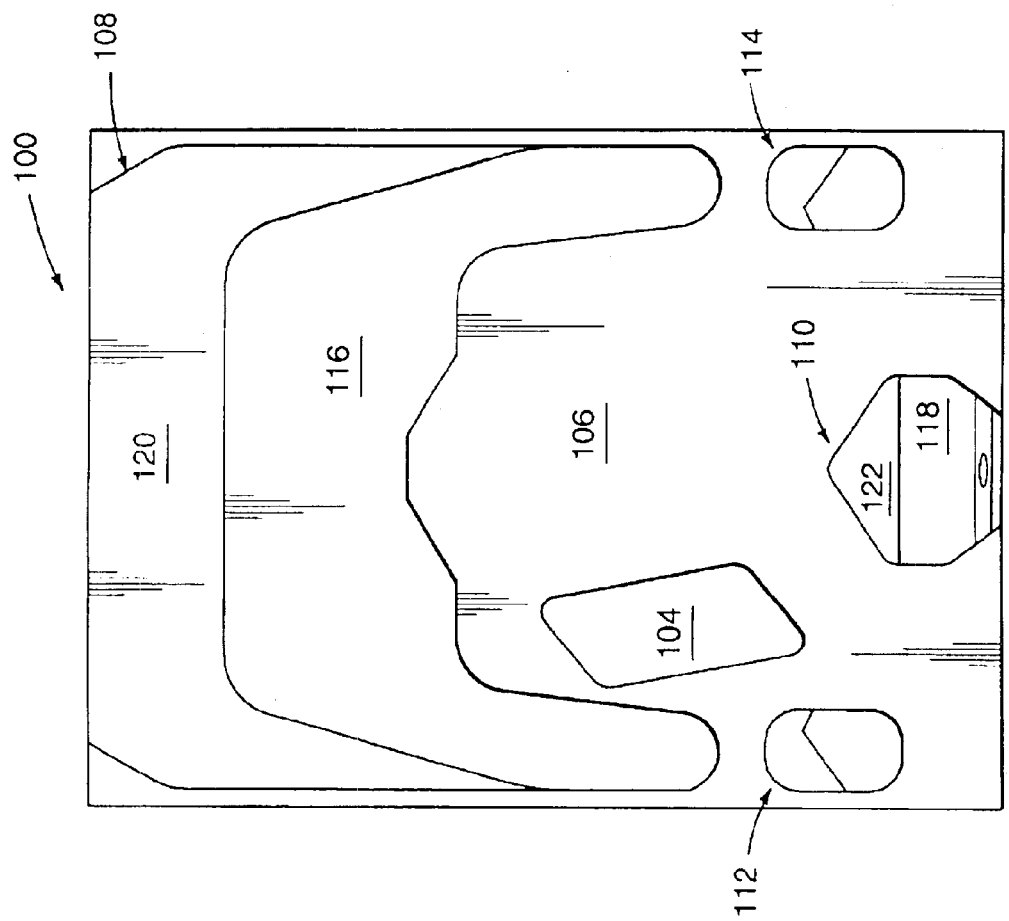
FIG. 6 shows a plan view of an air bearing surface according to an embodiment of the invention.

FIG. 6 is a plan view of an air bearing surface (ABS) 100 of a read/write head of the invention. ABS 100 is similar in many respects to ABS 40. ABS 100 further includes, however, a cavity patch 104 within a cavity 106 defined between a leading edge pad 108, a trailing edge pad 110, and in some embodiments, side pads 112 and 114. The cavity patch 104 can be of any height greater than that of the cavity 106, but should not exceed that of air bearing portions 116 and 118. In preferred embodiments the height of the cavity patch 104 is that of either the air bearing portions 116 and 118 or that of shallow step portions 120 and 122 to allow the cavity patch 104 to be created without departing from a double-etch manufacturing process. In other embodiments the cavity patch 104 can include more than one level in the same manner as the leading edge pad 108 and the side pads 112 and 114. Similarly, the cavity patch 104 can be split into two or more separate features.

The size, shape, and location of the cavity patch 104 shown in FIG. 5 have been optimized for that particular configuration of the leading edge pad 108, trailing edge pad 110, and side pads 112 and 114. In those embodiments with other pad configurations the size, shape, and location of the cavity patch 104 will, of course, be different. Optimizing these parameters is best performed through computer modeling. Such modeling is a well known tool in air bearing design. Accordingly, although the following general relationships are noted, they must be evaluated within the context of the air flow around and over the various pads of any particular design being considered.

The cavity patch 104 creates a region of positive pressure within the cavity 106 that tends to offset the overall negative lift of the cavity 106. The higher the cavity patch 104, the greater the positive pressure and the greater the lift that will be created to offset the overall negative lift of the cavity 106. Similarly, increasing the surface area of the cavity patch 104 increases the positive pressure and lift. However, increasing the surface area of the cavity patch 104 is achieved at the expense of the surface area of the cavity 106. So increasing the surface area of the cavity patch 104 both increases the positive lift of the cavity patch 104 and reduces the negative lift of the cavity 106.

The location of the cavity patch 104 in preferred embodiments is biased to the ID side of the ABS 100 as shown in FIG. 5. Biasing the cavity patch 104 to the ID side in this manner is performed to compensate for the variations in air flow velocity and direction as a function of skew angle. As noted above, when skew angle is negative the ID corner of the leading edge faces into the air flow and the air flow velocity is low. As the skew angle shifts to positive the air flow velocity increases and the direction of the air flow shifts so that the OD corner of the leading edge faces into it.

The following two Tables illustrate the improvements achieved by using the cavity patch 104. Table 1 shows improved fly height insensitivity to changes of altitude between sea level and 10,000 feet elevation, and Table 2 shows improved fly height insensitivity to changes of the magnetic disk rotation rate (RPM). In both Tables gap fly height is reported as a function of disk radii. As noted above, the transducer in the trailing edge pad is ideally located at the closest point on the ABS 100 to the magnetic disk surface. The spacing between the transducer and the magnetic disk surface is therefore the parameter measured and reported as the gap fly height. The disk radius is the distance from the center of the disk where the gap fly height measurements were taken and runs from a value near the ID (0.7 inches) to a value near the OD (1.7 inches).

TABLE 1

Gap Fly Height as a Function of Altitude and Disk Radius

| Altitude | Disk Radii (inches) | Gap Fly Height Without Patch ($\mu$") | Gap Fly Height With Patch ($\mu$") |
|---|---|---|---|
| Sea Level | 0.7 | 0.39 | 0.40 |
| Sea Level | 0.8 | 0.41 | 0.40 |
| Sea Level | 1.3 | 0.41 | 0.40 |
| Sea Level | 1.7 | 0.40 | 0.39 |
| 10,000 ft. | 0.7 | 0.25 | 0.28 |
| 10,000 ft. | 0.8 | 0.27 | 0.29 |
| 10,000 ft. | 1.3 | 0.29 | 0.30 |
| 10,000 ft. | 1.7 | 0.31 | 0.32 |

TABLE 2

Gap Fly Height as a Function of Disk rotation Rate and Disk Radius

| RPM | Disk Radii (inches) | Gap Fly Height Without Patch ($\mu$") | Gap Fly Height With Patch ($\mu$") |
|---|---|---|---|
| 7200 | 0.7 | 0.39 | 0.40 |
| 7200 | 0.8 | 0.41 | 0.40 |
| 7200 | 1.3 | 0.41 | 0.40 |
| 7200 | 1.7 | 0.40 | 0.39 |
| 5400 | 0.7 | 0.41 | 0.41 |
| 5400 | 0.8 | 0.44 | 0.43 |
| 5400 | 1.3 | 0.44 | 0.42 |
| 5400 | 1.7 | 0.41 | 0.39 |

It can be seen from Tables 1 and 2 that a read/write head including an ABS 40 (FIG. 4) without a cavity patch 104, when operated at sea level in proximity to a disk spinning at a disk rotation rate of 7200 RPM, will fly with a gap fly height ranging from 0.39 microinches ($\mu$") to 0.41 $\mu$". Since ABS 40 is optimized to accommodate different disk rotation rates, when the disk is slowed to a rotation rate of only 5400 RPM (with pressure kept constant at that of sea level) the gap fly height for the read/write head having ABS 40 changes little, actually increasing slightly to range from 0.42 $\mu$" to 0.44 $\mu$" (Table 2). However, when the read/write head including the ABS 40 is operater an air pressure equivalent to that found at 10,000 feet and in proximity to a disk spinning at a disk rotation rate of 7200 RPM, the gap fly height drops significantly, ranging from 0.25 $\mu$" near the disk ID to 0.31 $\mu$" near the disk OD.

For a read/write head including an ABS 100 (FIG. 6) with a cavity patch 104 the variation in the gap fly height at sea level air pressure and at 7200 RPM as a function of skew is improved compared to the read/write head with ABS 40. Under these conditions the gap fly height varies between 0.39 $\mu$" and 0.40 $\mu$" for the ABS 100 compared to a range of 0.39 $\mu$" to 0.41 $\mu$" for ABS 40. Under the conditions of sea level air pressure and 5400 RPM, the gap fly height for ABS 100 varies between 0.39 $\mu$" and 0.43 $\mu$" a slightly larger variation than shown by ABS 40 (0.41 $\mu$" to 0.44 $\mu$"). Importantly, though, the effect of ABS 100 on the gap fly height of a read/write head under the conditions of sea level air pressure and 5400 RPM is to reduce the maximum gap fly height from 0.4 $\mu$" to 0.43 $\mu$".

The most significant effect of ABS 100 with the cavity patch 104 is seen at a disk rotation rate of 7200 RPM when the air pressure is lowered from that at sea level to that at 10,000 feet. Under these conditions the gap fly height near the disk ID is improved from 0.25 $\mu$" to 0.28 $\mu$", and at the OD is improved from 0.31 $\mu$" to 0.32 $\mu$". Thus, not only does the read/write head with the ABS 100 fly further from the disk over the range of skew angles under these conditions, the variation in gap fly height as a function of skew is narrowed from 0.06 $\mu$" to 0.04 $\mu$". Thus, under the tested range of air pressures and disk rotation rates the cavity patch 104 keeps the gap fly height in a narrower range of only 0.28 $\mu$" to 0.43 $\mu$" compared to a range of 0.25 $\mu$" to 0.44 $\mu$" for ABS 40 without the cavity patch 104.

A double-etch method for fabricating a read/write head with an RPM insensitive air bearing surface is also disclosed herein. The method includes two masking and etching steps. In the first masking step several portions of a side of the read/write head are masked. These portions will ultimately become the air bearing portions of the leading edge pad and trailing edge pad of the air bearing surface described above. In some embodiments the first masking step also includes masking portions to become the air bearing portions of side pads. Methods for masking, including the use of photolithography, are well known in the art.

In the first etching step the side of the read/write head is etched to a first depth beneath a depth of the air bearing portions. This first etch defines what will become the height difference between the air bearing portions and the shallow step portions of the air bearing surface and is preferably in the range of about 3 $\mu$" to about 10 $\mu$". During the first etch the air bearing portions are protected by the mask produced in the first masking step. Methods for etching, such as reactive ion etching (RIE), are well known in the art. This step can also include, after the etch processing, stripping remaining mask material and any necessary cleaning steps.

In the second masking step the air bearing portions masked in the first masking step are again masked to continue to preserve them. Additionally, in the second masking step certain portions of the surface at the first depth are also masked. These portions of the surface at the first depth include a leading edge shallow step portion and a trailing edge shallow step portion, and in some embodiments can also include two side shallow step portions. After a further etching step, these portions will become the shallow step portions of the air bearing surface described above. Yet another portion of the surface at the first depth that is masked is a cavity patch portion disposed between the masked shallow step portions. The cavity patch portion masked at the first depth will ultimately become the cavity patch of the air bearing surface described above. As above, methods for masking are well known in the art.

In the second etching step the side is etched to a second depth beneath the first depth. The second etching step etches the side to the second depth wherever the side is not protected by the mask formed during second masking step. The sum of the first and second depths is preferably in the range of about 50 $\mu$" to about 120 $\mu$". Accordingly, the leading edge pad, the trailing edge pad, and the cavity patch, and in some embodiments two side pads, are completed by the second etching step, and a cavity of the air bearing surface described above is formed around the cavity patch and between the leading and trailing edge pads. As above, methods for etching are well known in the art.

Although the above-described double-etch method is preferred for minimizing processing steps, it will be readily apparent that additional masking steps and etching steps can be employed to form air bearing surfaces of the invention in which the various pads, cavity, and cavity patch define more than three levels.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. An air bearing surface of a read/write head, the air bearing surface comprising:
    a leading edge pad including trailing portions;
    a trailing edge pad;
    a cavity disposed between the trailing portions and the trailing edge pad and defining a first surface, wherein the leading edge pad further includes a shallow step portion that defines a second surface spaced above the first surface, and an air bearing portion that defines a third surface spaced above the first and second surfaces; and
    a cavity patch disposed within the cavity and defining a fourth surface spaced above the first surface and coplanar with the second surface.

2. The air bearing surface of claim 1 wherein the cavity patch is disposed between an ID side and a longitudinal axis of the air bearing surface.

3. The air bearing surface of claim 1 further comprising a side pad adjacent each of the trailing portions of the leading edge pad.

4. The air bearing surface of claim 3 wherein each side pad is integral with the adjacent trailing portions of the leading edge pad.

5. The air bearing surface of claim 1 wherein the cavity patch defines more than one surface spaced above the first surface.

6. The air bearing surface of claim 1 wherein the cavity patch is further disposed within the cavity such that the cavity patch is biased towards an ID side of the air bearing surface.

7. An air bearing surface of a read/write head, the air bearing surface comprising:
    a leading edge pad including trailing portions;
    a trailing edge pad;
    a cavity disposed between the trailing portions and the trailing edge pad and defining a first surface, wherein the leading edge pad further includes a shallow step portion that defines a second surface spaced above the first surface, and an air bearing portion that defines a third surface spaced above the first and second surfaces; and
    a cavity patch disposed within the cavity and defining a fourth surface spaced above the first surface and coplanar with the third surface.

8. The air bearing surface of claim 7 wherein the cavity patch is further disposed within the cavity such that the cavity patch is biased towards an ID side of the air bearing surface.

* * * * *